Oct. 9, 1934.   L. F. NENNINGER   1,976,138
BACK LASH COMPENSATOR
Filed March 7, 1932   3 Sheets-Sheet 1
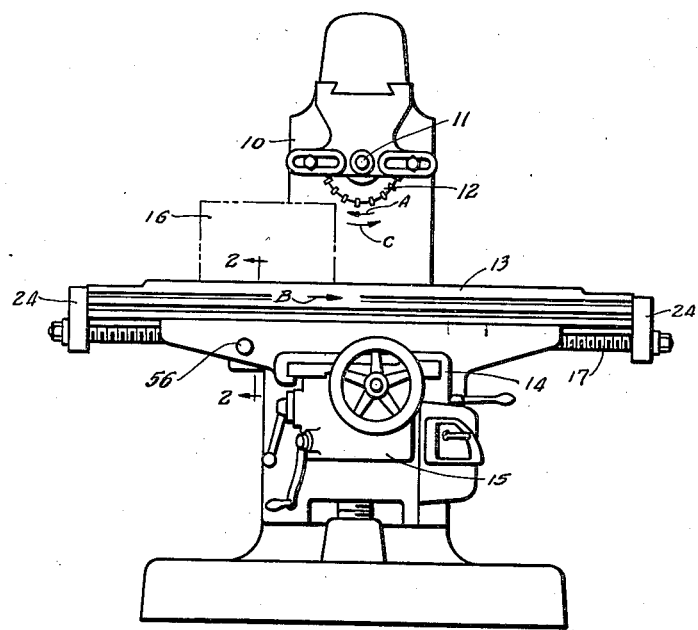
Fig. 1
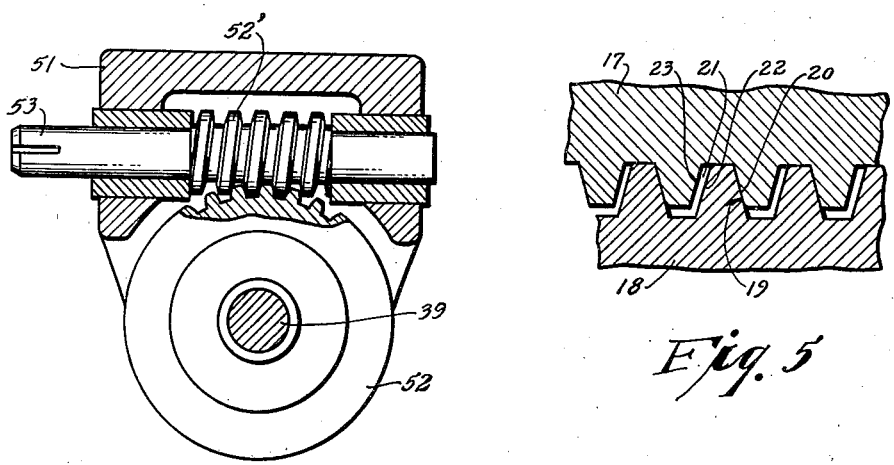
Fig. 4
Fig. 5
Inventor
LESTER F. NENNINGER
By
Attorney

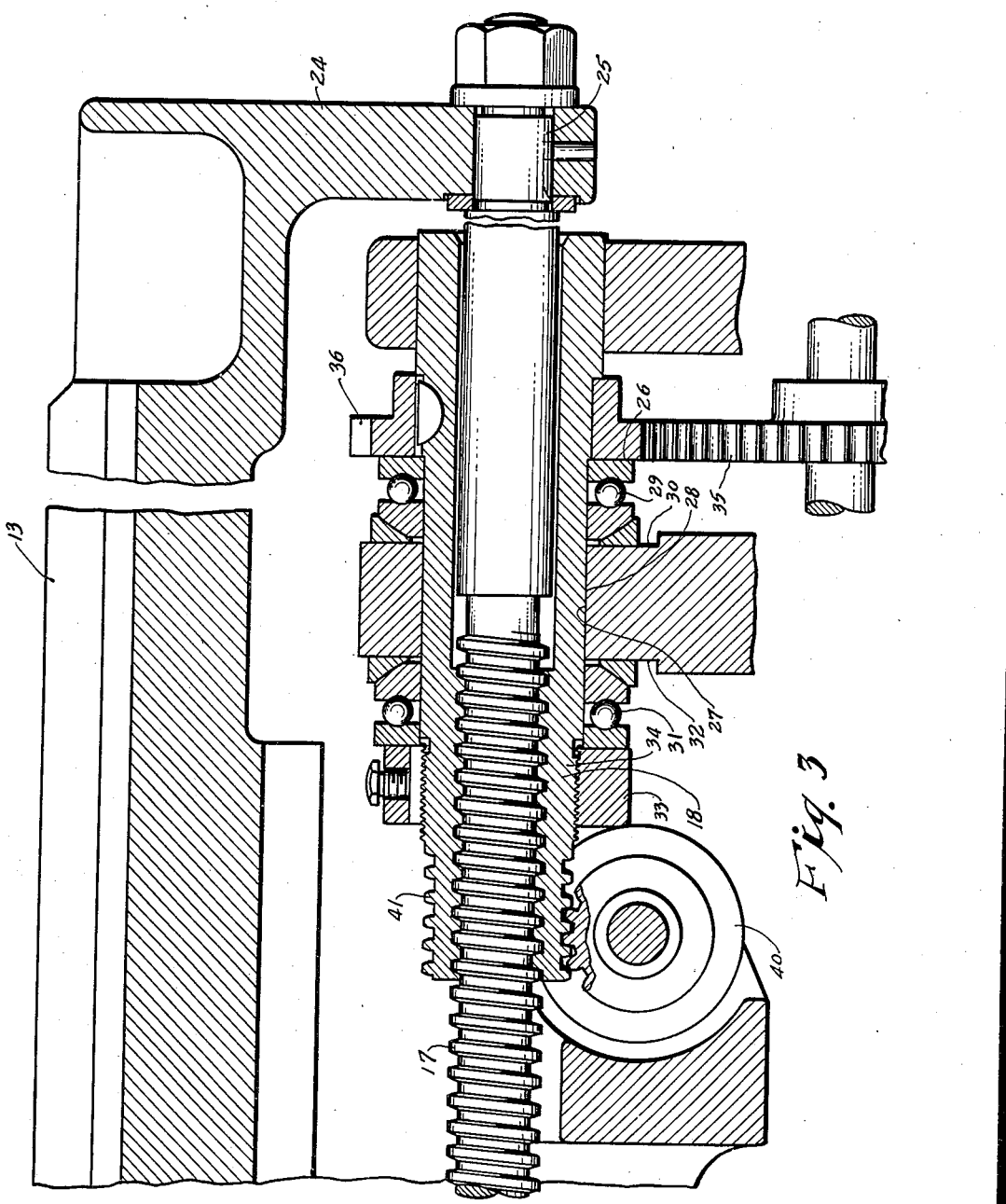

Patented Oct. 9, 1934

1,976,138

UNITED STATES PATENT OFFICE 1,976,138

BACK LASH COMPENSATOR

Lester F. Nenninger, Cincinnati, Ohio, assignor to The Cincinnati Milling Machine Company, Cincinnati, Ohio, a corporation of Ohio Application March 7, 1932, Serial No. 597,188

6 Claims. (Cl. 90—22)

This invention relates to improvements in translating mechanisms for machine tool slides.

In machine tools using a rotary tool, the cutting force developed thereby has a marked effect upon the work slide actuating mechanism used for feeding the work relative to the tool. For instance, if the cutting force is acting in the direction of slide movement, it attempts to accelerate the slide and if acting in a direction opposed to slide movement it attempts to retard feeding of the slide. The latter condition has no ill effects while the former condition may cause serious damage, especially at the beginning of the cut. The reason for this is that prior to engagement with the cutter any lost play in the mechanism will have been taken up in a direction to cause positive forward movement while at the moment of contact the cutting force usurps the duty of the feed mechanism, pulling the table forward, and taking up the back lash in the opposite direction causing the feeding mechanism to then act as a check against forward movement. It is this take-up in the back lash at the beginning of the cut which causes a sudden jump or momentary acceleration of table movement resulting in the work moving into the cutter at a faster rate than the tool can remove the metal, resulting in damage or breakage of the parts.

It is therefore one of the objects of this invention to provide an improved feeding mechanism which will maintain the same relative position between the slide and its actuating mechanism during cutting as well as during idling strokes thereby eliminating the possibility of acceleration of one with respect to the other by such external agencies as a cutting force acting in the direction of slide movement.

Another object of this invention is to provide an improved back lash eliminator for the feed mechanism of a machine tool slide movable in the direction of the cutting force.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts, Figure 1 is an elevation of a machine tool illustrating the principles of this invention.

Figure 3 is a sectional view of the feed screw drive mechanism with the back lash eliminator shaft revolved 90 degrees out of position to show better the relationship of the parts.

Figure 4 is a detailed section showing the friction adjusting mechanism as viewed on the line 4—4 of Figure 2.

Figure 5 is a diagrammatic view of the forces acting between lead screw and nut.

Figure 2:
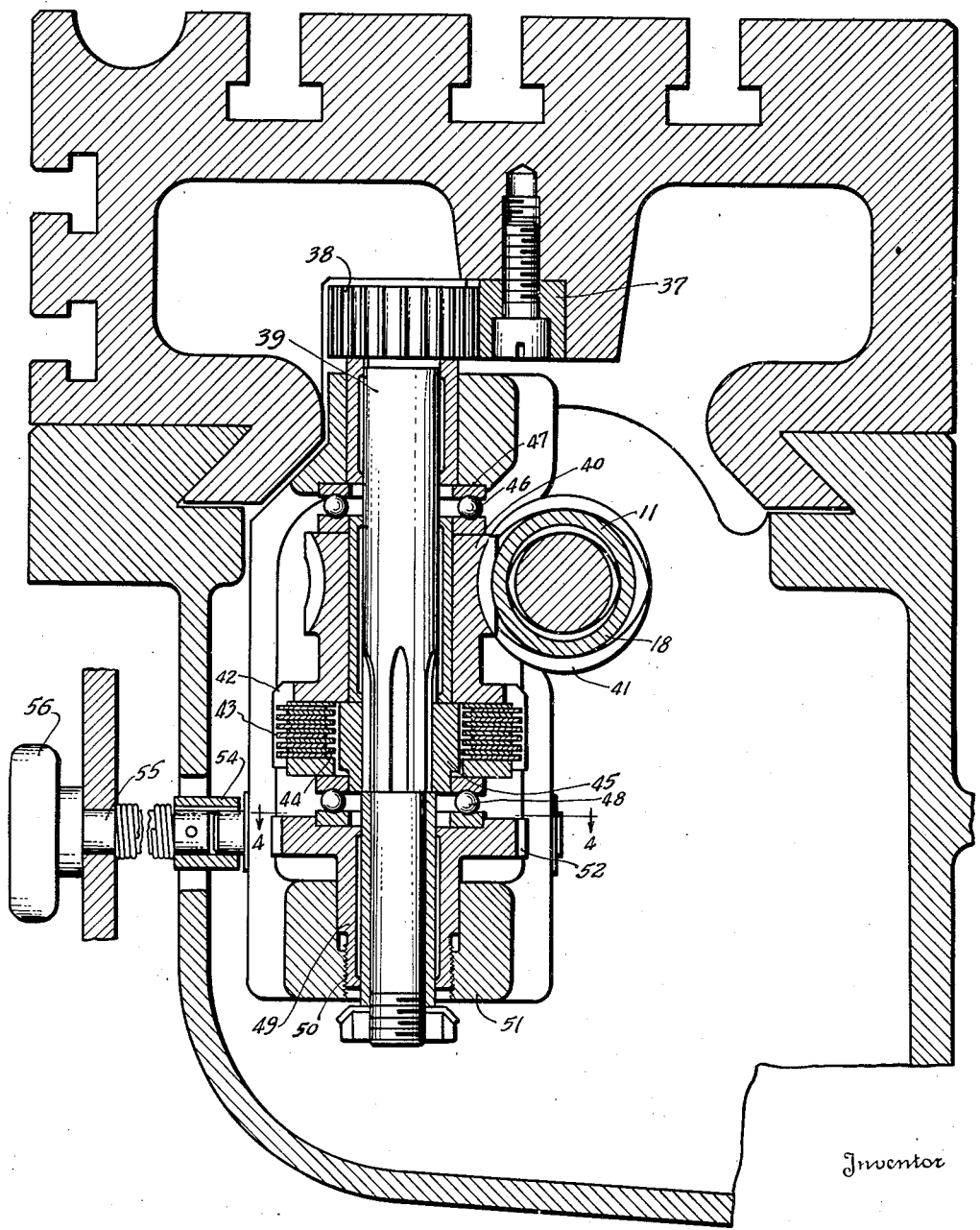
Figure 2 is a section through the table support as viewed on the line 2—2 of Figure 1.

A conventional milling machine structure, such as shown in Figure 1, has been chosen for illustrating the principles of this invention, and the reference numeral 10 indicates the column of such a machine having a rotatable cutter spindle 11 journaled in the upper part thereof for rotating a cutter 12 in cooperative relation to a work support or slide 13 adjustably mounted on a saddle 14, which, in turn, is supported by a knee 15 vertically movable on the column.

It is usual in present machines to rotate the cutter 12 in the direction of the arrow A and feed the work support 13 in the direction of the arrow B to effect stock removal from a work piece such as 16 carried by the slide. Many advantages, however, result from rotating the cutter in the opposite direction, as indicated by the arrow C, while still feeding the work in the direction of the arrow B, this method of cutting being known as a hook-in cut. If a conventional lead screw 17 and nut 18 were utilized to effect translation of the slide, and assuming that the screw is fixed, it will be seen from Figure 5 that the nut acting in the direction of the arrow 19 against the surface 20 of the screw will cause movement of the slide and work carried thereby toward the cutter. In this condition, a certain amount of lost motion exists at 21 between the surface 22 of the nut and the surface 23 of the thread. If now a cutter rotating in the direction C engages the work, it will be seen that the cutting force will tend to accelerate the movement of the work due to the lost motion 21, such acceleration causing the surface 23 of the screw to move into contact with the surface 22 of the nut. The nut will check further movement and act to determine or regulate the feed rate rather than as a positive means for effecting the feed. This causes a jump or momentary acceleration of the work support which jams the cutter and causes damage to the parts.

The mechanism of this invention has been designed to maintain contact between the surfaces 22 and 23 at all times whether actual cutting is occurring or not, thereby maintaining the same relative position between the parts, by eliminating back lash therefrom. These surfaces are to be considered as illustrative because it is apparent that, if the conditions were reversed it would be desirable to maintain contact between surfaces 19 and 20.

As shown in Figures 1 and 3, the screw 17 is mounted at opposite ends in brackets 24 depending from opposite ends of the machine tool slide 13. The screw is held against relative rotation by a key 25 but is fixed to the slide for effecting translation thereof. The nut 18 is provided with a shoulder 26 and a bearing portion 27 which is journaled in the fixed bearing 28 carried by the table support, such as the saddle in the present invention. An anti-friction bearing 29 is mounted between the shoulder 26 and one face 30 of bearing 28 and a second anti-friction thrust bearing 31 is mounted between the opposite face 32 of the bearing and the adjustable nut 33 threaded on the periphery of the sleeve portion 34. By adjusting member 33, all lost motion in an axial direction between the nut 18 and its bearing may be eliminated, thereby insuring that the parts will be held in a fixed axial position irrespective of the direction of outside disturbing forces acting thereon. This is important because any looseness in the mounting of the nut in its support would permit the cutting force to take advantage thereof and cause further irregularities in the movement of the table.

Any conventional type of feed transmission may be utilized as a power source for effecting rotation of the parts, and the gear 35 represents the terminal member of such a transmission which may be reversibly driven, meshing with the gear 36 integral with the sleeve 34 for imparting rotation thereto at variable feed rates and in opposite directions. From the foregoing mechanism, it will be seen that rotation of the gear 35, will effect rotation of gear 36 and associated nut to cause axial movement of screw 17 and translation of the work support 13 relative to the cutter 12.

In order to maintain contact between the surfaces 22 and 23, as previously explained, and thereby eliminate back lash, an additional mechanism has been provided in serial power transmitting relationship to the existing mechanism for imparting a faster rate of feed to the work support, thereby substituting a controlled force for constantly urging the work slide in the direction that the cutting force ordinarily would.

This auxiliary feed mechanism may be of any suitable type, a rack and gear mechanism being utilized in the present instance, comprising a rack 37 secured to the under-side of the table and having meshing therewith a pinion 38 fixed to the upper end of a vertical shaft 39. A worm gear 40 is carried by this shaft, in engagement with a worm 41 formed on the periphery of the nut 18 and being of such pitch relative to the screw 17 that the pinion 38 will effect a slightly greater advance of the table per revolution of the member 18 than will be effected by the nut 18 engaging the screw 17. This actual difference in feed of course could not be maintained because the table cannot move at two different rates at the same time, and therefore mechanism has been interposed between the worm gear 40 and the shaft 39 to permit slippage of one with respect to the other, but capable of imparting sufficient driving force to maintain advance of the table with respect to the nut 18 so as to maintain contact between the surfaces 22 and 23. This driving force should be sufficient to move the weight of the table and the work carried thereby against the friction between the table and its guideways, but does not need to be greater in amount than this because the cutting force actually furnishes the power for feeding the work into the cutter. It will be seen from this that the nut 18 therefore acts as a constant check against acceleration of the work support and regulates the feed to be imparted thereto by these external forces.

The worm gear 40, which is mounted for free rotation on the shaft 39, is provided with a flange portion 42 to which is keyed the alternate plates 43 of a friction clutch, the intermediate plates 44 of which are keyed to the member 45 which in turn is keyed or splined on the shaft 39 for longitudinal movement relative thereto. An anti-friction thrust bearing 46 is interposed between the gear 40 and the face 47 of the table support and a second anti-friction bearing 48 is interposed between the last plate of the clutch and an axially adjustable sleeve 49 which is threaded at 50 in a fixed part of the structure 51.

A worm gear 52 is formed integral with the sleeve 49 and actuated by a worm 52' for effecting rotation of the sleeve and thereby longitudinal movement of the parts to vary the friction between the plates and thereby the amount of force to be imparted to the shaft by the worm gear 40.

The operation of this mechanism is as follows. The worm 41 is power rotated simultaneously with the nut 18 and imparts rotation to the worm gear 40 which, through the friction clutch, effects a constant rotational urge on the shaft 39 and its pinion 38, the pinion acting through the rack 37 to impart a greater rate of movement to the table than is imparted by the nut to the lead screw. Since the table cannot move at two different rates at the same time, there will be a resistance to this accelerated movement which will retard the rate of rotation of the shaft 39 relative to its driver 40, this difference in rate being absorbed by the friction clutch. It is this constant urge to impart an accelerated movement to the work support that maintains metal to metal contact between the faces 22 and 23 of the nut 18 and the screw 17 which thereby effects the same result as would be effected by a cutting force acting in the same direction as table movement, but since it acts continuously and therefore prior to engagement of the cutter with the work, as well as at the same time, it insures that the back lash is taken up and prevents any jumping of the table or any momentary acceleration thereof during initial engagement between cutter and work.

The worm gear 52' is journaled in the fixed support 51 and has a keyed projecting end 53 for receiving a sleeve 54 pinned to the end of an adjustable shaft 55. This shaft extends through the outside wall of the machine where it is provided with a manual operating knob 56. The ratio of the gearing as well as the pitch of the threaded sleeve 49 is such that large adjustments of the member 56 will effect small changes in pressure in the frictional clutch thereby permitting a very accurate adjustment of the driving pressure. As previously mentioned this driving pressure does not have to be greater than the amount necessary to effect idling movement of the work table and work carried thereby or in other words the frictional resistance of the table in its guideways.

There has therefore been provided an improved mechanism for effecting translation of a machine tool slide in the same direction as the cutting force which will maintain the same relative position of the slide with respect to its actuating mechanism thereby eliminating the possibility of the slide jumping ahead upon contact with the cutter. It will be noted that the back lash eliminating mechanism is driven in serial power relationship with the conventional feeding mechanism thereby insuring better cooperation of the parts which adds to the efficiency of the mechanism.

What is claimed is:

1. A back lash eliminator for a machine tool slide movable in the direction of a cutting force having in combination mechanism for regulating and determining the rate of feed of said slide, additional mechanism for urging a greater feed rate upon the slide producing a resultant force in the direction of the cutting force to eliminate back lash from the regulating mechanism, a common power shaft, said regulating mechanism including a rotatable member actuated by said shaft and internally threaded for coupling to one of said mechanisms, external threads formed on said member for effecting actuation of the other mechanism, and a friction clutch interposed between the rotatable member and one of said mechanisms whereby the resultant imparted rates will be equal.

2. A back lash eliminator for a machine tool slide movable in the direction of a cutting force having in combination mechanism for regulating and determining the rate of feed of said slide, said mechanism including a lead screw attached to the slide and a rotatable nut journaled in the slide support, additional mechanism for urging a greater feed rate upon the support comprising a rack fixed to the slide, a rotatable pinion engaging said rack, a power shaft, means coupling the pinion and the nut to the shaft for joint rotation thereby, the speed ratio of the pinion connection being greater than the other connection whereby a resultant force in the direction of the cutting force will be produced thereby eliminating back lash from the lead screw actuating mechanism, and means in the transmission to the pinion to permit slippage relative to the power shaft whereby the resultant imparted rates will be equal.

3. A back lash eliminator for machine tools having a support and a slide reciprocably mounted in the support, means to effect said reciprocation including a lead screw fixed to the slide, a rotatable nut journaled in the support in engagement with said screw, anti-friction thrust bearings for preventing axial movement of the nut relative to the support, a reversibly driven power shaft operatively connected to the nut, a worm formed on the periphery of the nut, a rack attached to the slide, a driving pinion meshing with the rack, means to drive the pinion including a worm gear meshing with said worm, and a friction clutch connecting the worm gear to the pinion, the speed ratio of the pinion drive being greater than the speed ratio of the lead screw drive producing a resultant force in the direction of the cutting force to eliminate back lash between the nut and lead screw, said friction clutch permitting slippage between the transmissions whereby the resultant imparted rates will be equal.

4. A back lash eliminator for a machine tool slide comprising a screw and nut transmission for effecting actuation of said slide, an independent rack and gear transmission operatively coupled with the slide, one of said transmissions being of higher speed ratio than the other, a power driven member, means coupling one of said transmissions to the member for positive actuation thereby, friction clutch means coupling the transmission of higher speed ratio to the power member whereby sufficient power will be transmitted thereby to the transmission to eliminate back lash from the screw and nut transmission, and means to vary the power transmitting capacity of the friction clutch means and thereby the back lash resisting force.

5. In a milling machine having a support and a slide movable upon the support, transmission means for positively moving the slide including a rack and a lead screw attached in co-planar relation to the slide, a rotatable nut journaled in the support and in engagement with the screw, said nut having an external driven member attached to its periphery, power actuated means for rotating the nut, a shaft extending transversely of the lead screw and rack, spaced means mounted on the shaft in operative engagement with the rack and with said driven member, one of said means being fixed to the shaft, a friction clutch coupling the other means to the shaft, the drive ratio to the rack being greater than the drive ratio to the lead screw thereby causing slippage in said clutch and the elimination of back lash between the lead screw and its nut, and means to adjust the power transmitting capacity of the clutch.

6. In a milling machine having a support and a slide movable upon the support, transmission means for positively moving the slide including a rack and a lead screw attached in co-planar relation to the slide, a rotatable nut journaled in the support and in engagement with the screw, said nut having an external driven member attached to its periphery, power actuated means for rotating the nut, a shaft extending transversely of the lead screw and rack, spaced means mounted on the shaft in operative engagement with the rack and with said driven member, one of said means being fixed to the shaft, a friction clutch coupling the other means to the shaft, the drive ratio to the rack being greater than the drive ratio to the lead screw thereby causing slippage in said clutch and the elimination of back lash between the lead screw and its nut, means to adjust the power transmitting capacity of the clutch, said means including a plurality of friction discs, a rotatable member threaded in the support for creating pressure between the discs, a worm formed on the periphery of said member, a worm gear rotatably mounted in the support in engagement with said worm, and remote control means carried by the support for rotating said member and thereby varying the pressure between said friction discs.

LESTER F. NENNINGER.